US 8,856,892 B2

(12) United States Patent
Faludi

(10) Patent No.: US 8,856,892 B2
(45) Date of Patent: Oct. 7, 2014

(54) INTERACTIVE AUTHENTICATION

(75) Inventor: Gabor Faludi, Mannheim (DE)

(73) Assignee: SAP AG, Walldorf (DE)

( * ) Notice: Subject to any disclaimer, the term of this patent is extended or adjusted under 35 U.S.C. 154(b) by 241 days.

(21) Appl. No.: 13/534,614

(22) Filed: Jun. 27, 2012

(65) Prior Publication Data
US 2014/0007208 A1 Jan. 2, 2014

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)
*G06F 21/62* (2013.01)
*G06F 21/00* (2013.01)

(52) U.S. Cl.
CPC ............... *H04L 9/32* (2013.01); *H04L 9/3213* (2013.01); *G06F 21/62* (2013.01); *G06F 15/16* (2013.01); *G06F 21/00* (2013.01); *G06F 2212/178* (2013.01); *H04L 9/3234* (2013.01)
USPC ............... 726/5; 726/20; 726/21; 713/159; 713/172; 713/182; 713/185

(58) Field of Classification Search
CPC ... G06F 21/00; G06F 21/62; G06F 2212/178; G06F 15/16; H04L 9/00; H04L 9/32; H04L 9/3213; H04L 9/3234; H04L 63/0807
USPC .............. 726/4, 7, 20–21; 713/159, 172, 182, 713/185
See application file for complete search history.

(56) References Cited

U.S. PATENT DOCUMENTS

| 7,380,280 | B2 * | 5/2008 | de Jong ........................... 726/27 |
| 7,734,527 | B2 * | 6/2010 | Uzo ................................ 705/37 |
| 8,132,020 | B2 * | 3/2012 | Zhu et al. ...................... 713/185 |
| 8,312,540 | B1 * | 11/2012 | Kahn et al. ..................... 726/22 |
| 8,490,169 | B2 * | 7/2013 | Hird ................................. 726/9 |
| 2002/0031230 | A1 * | 3/2002 | Sweet et al. .................. 380/278 |
| 2004/0123159 | A1 * | 6/2004 | Kerstens et al. ............. 713/202 |
| 2008/0240447 | A1 * | 10/2008 | Zhu et al. ..................... 380/279 |

(Continued)

OTHER PUBLICATIONS

Microsoft TechNet "Configuring Account Lockout Policies"; retrieved from http://technet.microsoft.com/en-us/library/dd277400.aspx on Jun. 27, 2012; 4 pages.

(Continued)

*Primary Examiner* — Jeffrey Pwu
*Assistant Examiner* — Jayesh Jhaveri
(74) *Attorney, Agent, or Firm* — Fish & Richardson P.C.

(57) ABSTRACT

The present disclosure describes methods, systems, and computer program products for interactive authentication can include receiving a valid authentication credential or an invalid authentication credential associated with a digital identity. The credentials can be received from an end user at an input device in association with a login attempt. If a valid authentication credential is received, it is determined whether an identification token is received with the valid authentication credential. If received, the identification token is identified as a token included in a list of valid tokens associated with the digital identity at an authentication system. In response to the determination that the identification token is included in the list of valid tokens, it is determined whether a lockout period associated with the identification token in the list of valid tokens has expired. If expired, the end user associated with the login attempt can be authenticated.

14 Claims, 4 Drawing Sheets

(56) References Cited

U.S. PATENT DOCUMENTS

| | | |
|---|---|---|
| 2009/0077645 A1* | 3/2009 | Kottahachchi .................. 726/9 |
| 2009/0113543 A1* | 4/2009 | Adams et al. .................. 726/18 |
| 2010/0106512 A1* | 4/2010 | Hyndman et al. ............. 705/1.1 |
| 2010/0235882 A1* | 9/2010 | Moore ............................. 726/3 |
| 2010/0287555 A1 | 11/2010 | Thormaehlen et al. |
| 2011/0125667 A1 | 5/2011 | Faludi et al. |
| 2012/0079582 A1* | 3/2012 | Brown et al. ..................... 726/7 |
| 2012/0226813 A1* | 9/2012 | Ragusa et al. ................. 709/227 |
| 2013/0205380 A1* | 8/2013 | Avni et al. ........................ 726/7 |

OTHER PUBLICATIONS

OWASP The Open Web Application Security Project "Account Lockout Attack" Jun. 3, 2009; 2 pages.

* cited by examiner

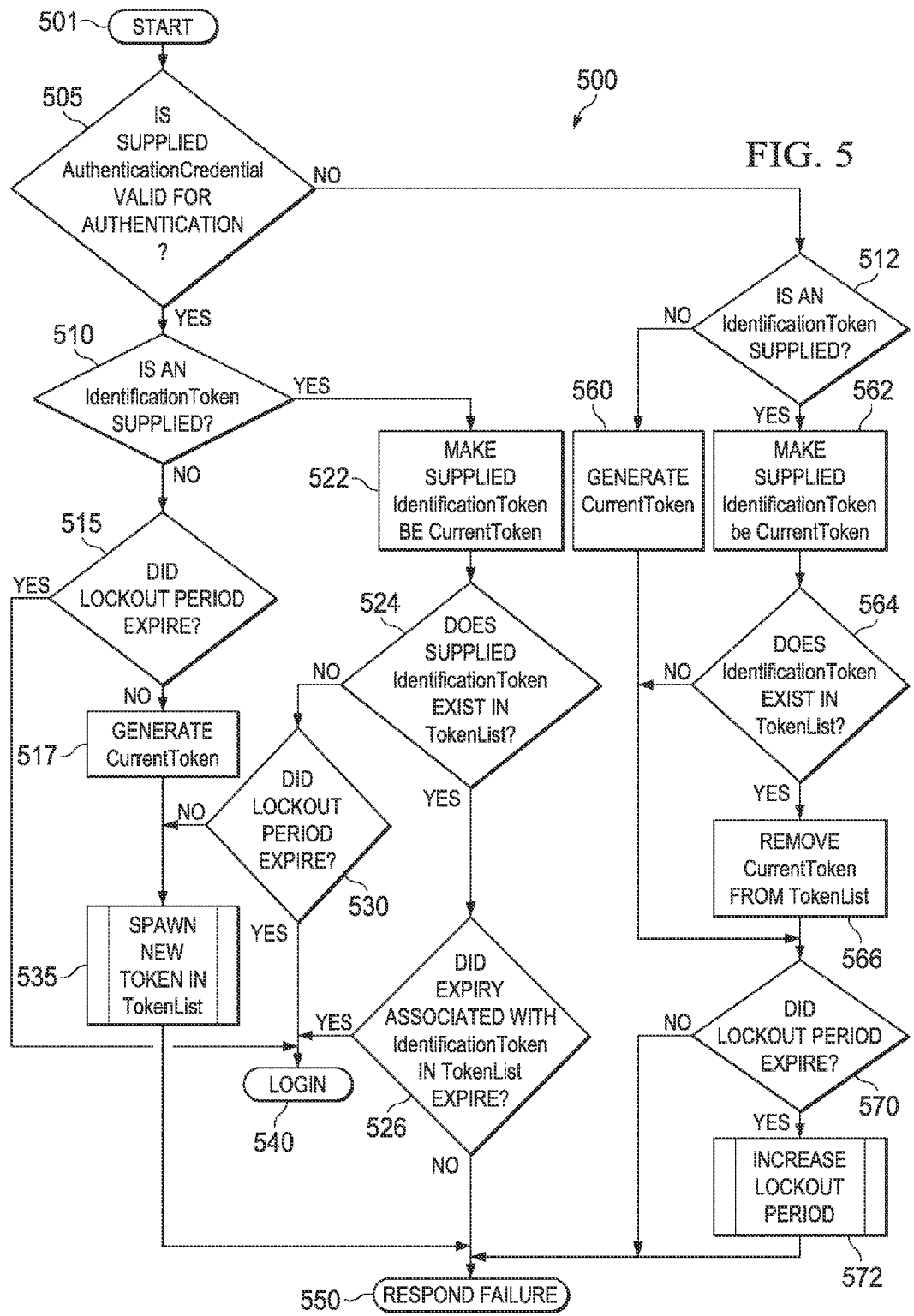

INTERACTIVE AUTHENTICATION

TECHNICAL FIELD

The present disclosure relates to software, computer systems, and computer-implemented methods for authentication.

BACKGROUND

In many instances, computer systems require end users to be authenticated for security reasons. For example, authenticated or legitimate end users may interact, operate, or perform the provided functions of the computer systems. Authentication of end users can include verifying a digital identity representing a real-life end user on the basis of certain authentication data or "credentials," for example, a combination of user name and password, visual cues (e.g., retina scans), biometric data (e.g., fingerprints), and others, as proof for the real-life end user's identity.

In some situations, certain human interactors (e.g., users or clients that can interact with the computer systems) or automated interactors (e.g., password-cracking computer programs) may attempt to use some computer systems of which they do not have a valid authentication credential. These interactors may misuse authentication procedures to become associated with a legitimate user's identity in the computer systems. For example, upon an authentication attempt, a computer system may experience that the credentials input do not satisfy the criteria for successful authentication. This may be for different reasons. For example, when a legitimate user attempts to be authenticated, errors can occur during data input (e.g., mistyping a password) or during sampling (e.g., during biometric data collection, such as scanning a fingerprint). When an illegitimate user attempts to be authenticated, errors can occur when wrong passwords are used and multiple trials of data input based on guessing or partial knowledge is provided (e.g., forged authentication data generated using manual input or automated tools). In many instances, computer systems are not capable of distinguishing between an error created by a legitimate user mistyping the authentication credentials and an error created by an illegitimate user forging authentication credentials using trial-and-error.

Some computer systems use a lockout period between authentication attempts, for example, creating a delay between a failed attempt and the next attempt. In some implementations, the computer systems may be configured to increase the lockout period after each failed attempt, as to deter illegitimate user's guessing strategy. A further measure may take the lockout period to an infinite time period (i.e., locking the digital identity permanently) and only allow a highly privileged and legitimate user (e.g., an administrator) to reset the lockout period of the locked digital identity. However, this defensive mechanism may be employed by an illegitimate user to maliciously tamper with the computer systems such that normal legitimate users are prohibited from authentication when the digital identity is permanently locked, at least before intervention by a highly privileged user/administrator to reset the lockout period. For example, an illegitimate user may constantly input authentication attempts, causing the computer system to permanently lock the associated digital identity.

SUMMARY

The present disclosure describes methods, systems, and computer-readable media for interactively authenticating end users. In many instances, computer systems verify authentication credentials of end users for security reasons. Illegitimate end users may use guessing, trial-and-error, and other attempts to obtain authentication. Such strategy can be prevented by a defensive mechanism that increases a lockout period between attempts of authentication. The illegitimate end users can employ the defensive mechanism to maliciously block out legitimate end users by inducing the lockout period. The present disclosure provides a method preventing illegitimate end users from attempting to overcome authentication credentials by guessing and from tampering with the defensive mechanism to block out legitimate end users. For example, the disclosed method can prevent illegitimate end users from misusing the lockout mechanism to disable access of legitimate users to the computer system. Legitimate users can be allowed to authenticate themselves at the computer system with minor disruption in the context of the entire computer system. Illegitimate end users would not be allowed to disrupt normal operations by blocking legitimate users from authentication within certain time frame. And, these operations require insignificant computational resources of the computer system.

In a general aspect, a method for interactive authentication can include receiving, at first, a valid authentication credential or an invalid authentication credential associated with a digital identity. The credentials can be received from an end user at an input device in association with a login attempt. If a valid authentication credential is received, it is determined whether an identification token is received with the valid authentication credential. In response to the determination that the identification token is received, the identification token is identified as a token included in a list of valid tokens associated with the digital identity at an authentication system. In response to the determination that the identification token is included in the list of valid tokens, it is determined whether a lockout period associated with the identification token in the list of valid tokens has expired. The end user associated with the login attempt can then be authenticated in response to the determination that the lockout period has expired.

These and other embodiments can each optionally include one or more of the following features. For example, when the identification token is not received with the valid authentication credential, a lockout period associated with the digital identity is determined to be expired or not. If not expired, a new identification token associated with the current lockout period can be generated and added in the list of valid tokens associated with the digital identity; and the authentication of the end user is rejected. In some implementations, in response to the determination that the identification token is not received, it is determined that the lockout period associated with the digital identity has expired. The end user can then be authenticated in response to the determination that the lockout period associated with the digital identity has expired. In response to the determination that the identification token is not included in the list of valid tokens associated with the digital identity, it is determined that whether the lockout period associated with the digital identity has expired; if expired, the end user associate with the login attempt is authenticated. The new identification token can be added to the list of valid tokens in response to the lockout period associated with the digital identity has not expired; and the end user associated with the login attempt is rejected.

These and other embodiments can each optionally include one or more of the following features. The authentication of the end user is rejected in response to the determination that the lockout period associated with the identification token in the list of valid tokens that have not expired. In some implementations, authenticating the end user associated with the login attempt includes grating the login attempt. The identification token can be automatically provided by the input device at the login attempt. Multiple digital identities can be associated with the authentication system. Each digital identity can be associated with a corresponding list of valid tokens.

When an invalid authentication credential is received, it is determined whether an identification token is received with the invalid authentication credential. In response to the determination that an identification token is received, the received identification token is assigned as a new identification token. The identification token is determined for its inclusion in a list of valid tokens associated with the digital identity at the authentication system. If the identification token is included in the list of valid tokens, the new identification token is removed from the list of the valid tokens and the authentication of the end user associated with the login attempt is rejected.

These and other embodiments can each optionally include one or more of the following features. For example, a new identification token can be generated in response to the determination that an identification token is not received with the invalid authentication credential. The new identification token can be omitted from the list of valid tokens. It is determined whether a lockout period associated with the digital identity has expired; and if not expired, the authentication of the end user associated with the login attempt is rejected. In some implementation, a time duration for the lockout period associated with the digital identity can be increased in response to the determination that the lockout period associated with the digital identity has expired.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 illustrates an example overall flow chart for interactive authentication.

DETAILED DESCRIPTION

This specification describes systems, methods, apparatus, and computer-readable media for interactively authenticating end users. In many instances, computer systems verify authentication credentials of end users for security reasons. Illegitimate end users may use guessing, trial-and-error, and other attempts to obtain authentication. Such strategy can be prevented by a defensive mechanism that increases a lockout period between attempts of authentication. The illegitimate end users can employ the defensive mechanism to maliciously block out legitimate end users by inducing the lockout period. The present disclosure provides a viable method preventing illegitimate end users from attempting to overcome authentication credentials by guessing and from tampering with the defensive mechanism to block out legitimate end users. For example, the disclosed method can prevent illegitimate end users from misusing the lockout mechanism to disable access of legitimate users to the computer system. Legitimate users can be allowed to authenticate themselves at the computer system with minor disruption in the context of the entire computer system. Illegitimate end users would not be allowed to disrupt normal operations by blocking legitimate users from authentication within certain time frame.

At a high level, the disclosed method can prevent illegitimate end users from tampering with computer systems by introducing an identification token issued to each human interactor or user agent software used by the human interactor. The token enables interactive authentication and can allow for a short-term identification of the end user, by distinguishing illegitimate users from legitimate ones. The token can be verified in a list of valid tokens that can bypass the lockout period induced by an illegitimate end user so that legitimate end users can avoid the lockout period with valid credentials. For illegitimate end users, the token can be identified with erroneous credentials to expose the illegitimate end users to defensive security mechanisms (e.g., increasing time duration for the lockout period after each failed attempt).

Figure 1:
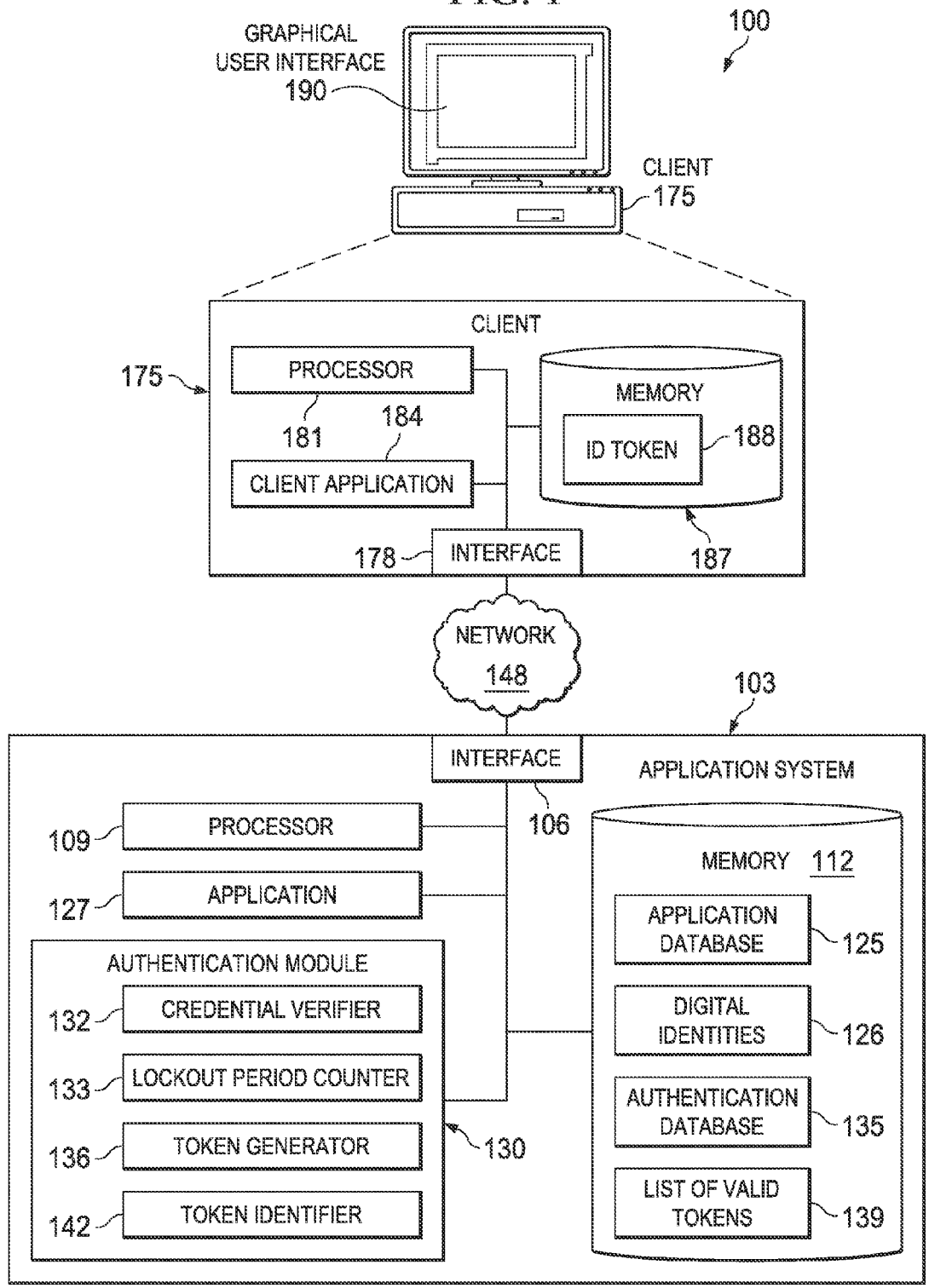
FIG. 1 illustrates an example environment for implementing various features of a system for interactively authenticating end users.

FIG. 1 illustrates an example environment 100 for implementing various features of a system for interactively authenticating end users. The illustrated environment 100 includes, or is communicably coupled with, a client 175, and an application system 103. At least some of the communications between the application system 103 and the client 175 may be performed across or via network 148. In general, environment 100 depicts an example configuration of a system for authenticating the client 175 to the application system 103. For example, the application system 103 can provide applications, processing resources, and/or database to the client 175 (e.g., to support client applications 184). The client 175 is required to have valid authentication credentials to use different functionalities provided by the application system 103. The environment 100 is an example, and in alternative implementations, the elements illustrated in FIG. 1 may be included in or associated with different and/or additional servers, clients, networks, and locations other than those as shown. For example, there may be additional clients, such as multiple clients connected to one or more application systems similar to the application system 103 to obtain various functionalities and services. That is, one or more of the components illustrated within the application system 103, the client 175, or any of the other illustrated components, may be located in multiple or different servers, cloud-based networks, or other locations accessible to the application system 103 (e.g., either directly or indirectly via network 148).

At a high level, the application system 103 can be connected with one or more clients such as the client 175. For example, the application system 103 can receive login requests along with authentication credentials from the client 175. The authentication credentials can be verified using an authentication module 130 in the application system 103. Once authenticated, the client 175 may be granted access to resources of the application system 103, such as, for example, a processor 109, an application 127, and an application database 125 stored in a memory 112. In some implementations, the authentication process can enable the client 175 to use functionalities within the client 175. For example, the client 175 can include a client application 184 that requires authentication from and connection to the application system 103. The interactive authentication process can include the communications between the client 175 and the application system 103, where credentials and identification tokens are sent and received or generated back and forth. For example, the client 175 can first send certain authentication credentials with or without an identification token to the application system 103. The authentication module 130 of the application system 103 can verify the authentication credentials using a credential verifier 132 and identify whether the identification token is stored in a list of valid tokens 139 using a token identifier 142. A successful authentication includes a valid authentication credential and a valid identification token. Details of the authentication process are described in the following.

In the illustrated implementation of FIG. 1, the application system 103 includes an interface 106, the processor 109, the memory 112, the application 127, and the authentication module 130. In some instances, the application system 103 and its illustrated components may be separated into multiple components executing at different servers and/or systems. For example, while FIG. 1 illustrates the application 127 and the authentication module 130 as separate components, other example implementations can include the authentication module 130 within a separate system, as well as within as part of the application 127's inherent functionality. Thus, while illustrated as a single component in the example environment 100 of FIG. 1, alternative implementations may illustrate the application system 103 as including multiple parts or portions, accordingly.

The interface 106 is used by the application system 103 to communicate with other systems in a client-server or other distributed environment (including within environment 100) connected to the network 148 (e.g., the client 175, as well as other systems communicably coupled to the network 148). The interface 106 generally includes logic encoded in software and/or hardware in a suitable combination and operable to communicate with the network 148. More specifically, the interface 106 may include software supporting one or more communication protocols associated with communications such that the network 148 or the interface's hardware is operable to communicate physical signals within and outside of the illustrated environment 100.

The processor 109 can be any appropriate processing unit or units to enable computation in the application system 103. Although illustrated as a single processor 109 in the application system 103, two or more processors may be used in the application system 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the application system 103 and, specifically, the functionality associated with the corresponding application 127 and the authentication module 130. In one implementation, the server's processor 109 executes the functionality required to receive inbound communications from and send outbound communications to the client 175, as well as the functionality required to perform the operations of the associated application 127 and the authentication module 130, among others.

The memory 112 of the illustrated application system 103 stores at least an application database 125, a number of digital identities 126, an authentication database 135, the list of valid tokens 139, and other data and program instructions. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects, object models, and data, including classes, frameworks, applications, backup data, business objects, jobs, web pages, web page templates, database tables, process contexts, repositories storing services local to the application system 103, and any other appropriate information including any parameters, variables, algorithms, instructions, rules, constraints, or references thereto associated with the purposes of the application system 103 and its functionality. In some implementations, including a cloud-based system, some or all of the memory 112 may be stored remote from the application system 103, and communicably coupled to the application system 103 for usage. Specifically, memory 112 can store authentication module 130. Some or all of the elements illustrated within memory 112 may be stored external to the memory 112. These items are made accessible to the authentication module 130.

The memory 112 includes the application database 125 that supports the application 127, a number of digital identities associated with the application system 103, an authentication database 135 containing authentication information associated with the digital identities 126, and a list of valid tokens 139 associated with the authentication database 135. The application database 125 can include any appropriate forms of data, metadata, and other data types in support for the application 127. For example, the application database 125 can include files for running operation systems or programs, files generated in the operation systems, files produced by users, and other types of data. The digital identities 126 can be created or assigned in the application system 103. In some implementations, the digital identities 126 are created in the application 127 when human interactors associated with the digital identities 126 are granted to use the application 127. For example, the digital identities 126 can be associated with the files in the application database 125 generated in the application 127. The authentication database 135 can include files and information related to each digital identity 126 at its creation. For example, access is granted to those digital identities 126 who possess authentication credentials given or assigned to them. The authentication credentials have corresponding records stored in the authentication database 135. The list of valid tokens 139 can be additional authentication information tied to the credentials stored in the authentication database 135. For example, the list of valid tokens 139 can include only the valid tokens of all tokens that are provided by or generated for each end user attempting to be authenticated. Tokens used by illegitimate end users who consistently fail to provide valid authentication credentials are generally not stored in the list of valid tokens 139. In some instances, tokens used by illegitimate end users may be stored in a separate location, or may be included within the same store as the list of valid tokens 139 with additional information identifying them as invalid tokens.

At a high level, the application 127 can be any application, program, module, process, or other software that may execute, change, delete, generate, or otherwise manage information associated with a particular application system 103. In particular, the application 127 may be associated with one or more business processes that communicate with other users, applications, systems, and components to send, receive, and process events. In some instances, a particular application 127 may operate in response to and in connection with one or more requests received from an associated client 175 or other remote client. Additionally, a particular application 127 may operate in response to and/or in connection with one or more requests received from other applications external to the application system 103. In some instances, the application 127 may request additional processing or information from an external system or application. In some instances, one or more of the applications may represent a web-based application accessed and be executed by remote clients 175 via the network 148 (e.g., through the Internet, or via one or more cloud-based services associated with the application 127). Further, while illustrated as internal to the application system 103, one or more processes associated with a particular application 127 may be stored, referenced, or executed remotely. For example, a portion of a particular application 127 may be a web service that is remotely called, while another portion of the application 127 may be an interface object or agent bundled for processing at a remote system (not illustrated), or a particular client 175 (e.g., the client application 184). Moreover, any or all of a particular application 127 may be a child or sub-module of another software module or enterprise application (not illustrated) without departing from the scope of this disclosure. Still further, portions of the particular application 127 may be executed or accessed by a user working directly at the application system 103, as well as remotely at a corresponding client 175.

The authentication module 130 can provide security functions for the application 127, as well as for the application system 103 in general. At a high level, the authentication module 130 can provide verification to authentication credentials using a credential verifier 132. For example, the client 175 can initiate a connection or login request to the application system 103 using an authentication credential. The credential verifier 132 can determine whether the provided credential from the client 175 is valid. The credential verifier 132 is part of the authentication module 130 and may provide partial weight in the overall authentication process. For example, in addition to the credential verifier 132, the authentication module 130 further includes at least a lockout period counter 133, a token generator 136, and a token identifier 142. The lockout period counter 133 can be used to determine if a lockout period has expired for the digital identities 126 that are attempting to log-in. For example, end users with correct authentication credentials may not be authenticated when the lockout period associated with the digital identity determined by the lockout period counter 133 has not expired and there is no valid identification token provided. The token generator 136 can generate tokens for end users who are attempting to be authenticated but do not provide identity tokens. The identification token can be identified using the token identifier 142.

In some implementations, the authentication module 130 can interactively authenticate (or refuse to authenticate) the client 175 in response to four example scenarios: 1) when the credential verifier 132 determines that the credential provided by the client 175 is valid and the lockout period counter 133 determines that the lockout period has expired; 2) when the credential verifier 132 determines that the credential provided by the client 175 is valid but the lockout period counter 133 determines that the lockout period has not expired; 3) when the credential verifier 132 determines that the credential provided by the client 175 is invalid and the lockout period counter 133 determines that the lockout period has expired; and 4) when the credential verifier 132 determines that the credential provided by the client 175 is invalid and the lockout period counter 133 determines that the lockout period has not expired.

In the first scenario, when the credential verifier 132 determines that the credential provided by the client 175 is valid and the lockout period counter 133 determines that the lockout period has expired, the client 175 can be successfully authenticated, even if there is no token is supplied with the credential. For example, a legitimate end user accessing as the client 175 can be authenticated to the application system 103 with valid credentials and no lockout period induced by failed authentication attempts disregarding whether a token is supplied with the credential or not. In some instances, the valid credentials provided by the legitimate end user can be combined with a token that is either included or not in the list of valid tokens 139 and the authentication attempt is successful. This scenario can assure a non-disruptive authentication process for legitimate end users accessing as the client 175 using valid credentials (i.e., token information not used against valid credentials) when no lockout period is currently in effect. In some situations, a lockout period associated with a token in the list of valid tokens (i.e., versus a general lockout period associated with the digital identity) may prevent successful authentication.

In the second scenario, when the credential verifier 132 determines that the credential provided by the client 175 is valid but the lockout period counter 133 determines that the lockout period has not expired, the authentication of the client 175 depends on a token supplied with the credentials to distinguish a legitimate end user from an illegitimate end user, both accessing from one or more clients (e.g., client 175). For example, this scenario can be created when at least one authentication failure has occurred, causing a lockout period (e.g., caused by a mistake or malicious attempt). Tokens can then be used to enable legitimate users to be authenticated even when the lockout period is not yet expired. In some implementations, if the token identifier 142 determines that there is no token supplied with the credential, even though the credential verifier 132 determines that the provided credentials are valid, the authentication module 130 can reject the authentication attempt and generate a token at the token generator 136 for the end user associated with the valid credentials. The generated token is added to the list of valid tokens 139 in the memory 112 and will be used for the next authentication attempt as to identify the same end user (i.e., the end user having a valid credential can bypass the lockout period if the credential is associated with a token in the list of valid tokens and where the current lockout period, if one is in effect, is not the lockout period in which the valid token was issued). In the next authentication attempt, valid credentials as well as the created token added in the list of valid tokens are received in the authentication module 130, authentication is then granted to the client 175. If the supplied token is not included in the list of valid tokens 139, the authentication module 130 can add the supplied token into the list of valid tokens 139 and reject the current authorization attempt. This may trigger a particular lockout period associated with the token supplied with the credentials (e.g., as opposed to a general lockout period associated with the digital identity). The particular lockout period has a higher security priority than the token qualification. For example, given valid credentials and their associated tokens in the list of valid tokens 139, if the particular lockout period associated with the token has not expired, the authentication attempt is rejected; or else successful. Each valid token is specifically associated with a particular digital identity. Multiple lists of valid tokens may exist for a plurality of digital identities.

In the third scenario, when the credential verifier 132 determines that the credential provided by the client 175 is invalid and the lockout period counter 133 determines that the lockout period has expired, authentication is rejected. In addition, tokens can be managed to distinguish legitimate end users from illegitimate end users, therefore only exposing the illegitimate end users to defensive security mechanisms. For example, if there is no token supplied with the invalid credentials, a token for the end user is generated at the token generator 136 and the general lockout period associated with the digital identity can be induced and/or increased at the lockout period counter 133. If a token is supplied but not included in the list of valid tokens 139, as identified by the token identifier 142, the supplied token is reused and the general lockout period is increased at the lockout period counter 133. If a token is supplied along with invalid credentials and is included in the list of valid tokens 139, the token is removed from the list of valid tokens 139 (because the credential is invalid) and the general lockout period is increased at the lockout period counter 133.

In the fourth scenario, when the credential verifier 132 determines that the credential provided by the client 175 is invalid and the lockout period counter 133 determines that the lockout period has not expired, authentication is rejected and the supplied tokens are reused (i.e., against illegitimate end users and their attempts to tamper with the application system 103). In this scenario, supplied tokens associated with the invalid credentials are removed from the list of valid tokens 139 and the supplied tokens are reused (i.e., as a tag for end users that cannot provide valid credentials). Because the lockout period has not expired, an increase of lockout period duration may not be implemented. In some implementations, the token identifier 142 may identify, during the lockout period, certain end users constantly attempting to be authenticated using different credentials (e.g., illegitimate end users guessing for correct credentials). The token identifier 142 can operate with the lockout period counter 133 to permanently block the end user associated with the token by increasing the lockout period to infinity. The different components in the authentication module 130 can cooperate in other methods to prevent illegitimate end users from tampering the application system 103 via the client 175. The reason for sending a token back regardless of the correctness of the input credentials is for showing a uniform reaction to end users, therefore the token may not be used as an indicator for the correctness of the provided credentials (e.g., the token is not informing the end users whether the credentials are correct or not).

In general, the application system 103 is any server or system that stores, manages, and executes functionality associated with the application 127 and the authentication module 130. Additionally, the application system 103 may execute one or more applications 127. For example, each application system 103 may be a Java® 2 Platform, Enterprise Edition (J2EE)-compliant application server that includes Java® technologies such as Enterprise JavaBeans® (EJB), J2EE Connector Architecture (JCA), Java® Messaging Service (JMS), Java® Naming and Directory Interface (JNDI), and Java® Database Connectivity (JDBC). In some instances, each application system 103 may store a plurality of various applications; while in other instances, the application system 103 may be a dedicated server meant to store and execute the authentication module 130 for a particular platform or application and its related functionality. In some instances, the application system 103 may include a web server or be communicably coupled with a web server, where one or more of the applications 127 associated with the application system 103 represent web-based (or web-accessible) applications accessed and executed through requests and interactions received by the client 175, executing a client application 184 operable to interact with the programmed tasks or one or more applications 127.

The application system 103 can include an electronic computing device operable to receive, transmit, process, store, or manage data and information associated with the environment 100. The application system 103 illustrated in FIG. 1 can be responsible for receiving application-related requests from one or more clients 175 (as well as any other entity or system interacting with the application system 103, including desktop or mobile client systems), responding to the received requests by processing said requests in the associated application 127, and sending the appropriate responses from the appropriate component back to the requesting client 175 or other requesting system. Components of the application system 103 can also process and respond to local requests from a user locally accessing the server 103. Accordingly, in addition to requests from the client 175 illustrated in FIG. 1, requests associated with a particular component may also be sent from internal users, external or third-party customers, and other associated business applications, business processes, as well as any other appropriate entities, individuals, systems, or computers. In some instances, the application 127 or the client application 184 may be web-based applications executing functionality associated with a networked or cloud-based business process.

Referring now to the client 175 illustrated in FIG. 1, the client 175 may be any computing device operable to connect to or communicate with at least one of the application system 103 using a wireline or wireless connection directly or via the network 148, or another suitable communication means or channel. In some instances, the client 175 may be a part of or associated with a business process involving one or more of a remote developer or user associated with the application 127, for example, the client application 184. It will be understood that there may be any number of clients 175 associated with, or external to, environment 100. For example, while illustrated environment 100 includes a client 175, alternative implementations of environment 100 may include multiple sellers or customers communicably coupled to the one or more of the systems illustrated. In some instances, one or more clients 175 may be associated with administrators of the environment, and may be capable of accessing and interacting with the settings and operations of the authentication module 130, one or more applications 127, and/or other components of the illustrated environment 100. Additionally, there may also be one or more additional clients 175 external to the illustrated portion of environment 100 capable of interacting with the environment 100 via the network 148.

The client 175 includes at least an interface 178, a processor 181, the client application 184, and a memory 187. The processor 181 performs analysis and data extraction related to the client application 184. Although illustrated as a single processor 181 in the client 175, two or more processors may be used in the client 175 according to particular needs, desires, or particular embodiments of environment 100. The processor 181 may be a central processing unit (CPU), a blade, an application specific integrated circuit (ASIC), a field-programmable gate array (FPGA), or another suitable component. Generally, the processor 181 executes instructions and manipulates data to perform the operations of the client 175 and, specifically, the functionality associated with the client application 184.

The memory 187 of the client 175 stores data and program instructions, rules associated with inbound and/or outbound communication. In particular, the memory 187 can include an identification token 188. The identification token 188 can be stored in the memory 187 prior to sending credentials to the application system 103, or can be saved from the application system 103 as the token generator 136 generates an identification token for the client 175. The memory 187 may include any memory or database module and may take the form of volatile or non-volatile memory including, without limitation, magnetic media, optical media, random access memory (RAM), read-only memory (ROM), removable media, or any other suitable local or remote memory component. The memory 187 may store various objects, object models, and data, including classes, frameworks, applications, backup data, business objects, jobs, web pages, web page templates, database tables, process contexts, repositories storing services local to the client 175, and any other appropriate information including any parameters, variables, algorithms, instructions, rules, constraints, or references thereto associated with the client 175 and its functionality. In some implementations, including a cloud-based system, some or all of the memory 187 may be stored remote from the client 175, and communicably coupled to the client 175 for usage. Some or all of the elements may be stored external to the memory 187, for example, in an internet-based storage location.

The GUI 190 associated with the client 175 includes a graphical user interface operable to, for example, allow the client 175 to interface with at least a portion of the client application 184, and/or the associated operations and functionality. Generally, the GUI 190 provides the particular user with an efficient and user-friendly presentation of business data provided by or communicated within the system. The GUI 190 may include a plurality of customizable frames or views having interactive fields, pull-down lists, and buttons operated by the user. For example, the GUI 190 may provide interactive elements that allow a user to interact with a particular component within and/or external to environment 100. Different portions of the corresponding component's functionality may be presented and accessible to the user through the GUI 190, such as through the client application 184 (e.g., a web browser). Generally, the GUI 190 may also provide general interactive elements that allow a user to access and utilize various services and functions of a particular component. In some instances, the client application 184 may be used to access various portions of the application system 103. In some instances, the client application 184 may be an agent or client-side version of the application 127 or other suitable component of the application system 103. The GUI 190 may present the information of the client application 184 for viewing and interaction. In general, the GUI 190 is often configurable, supports a combination of tables and graphs (bar, line, pie, status dials, etc.), and is able to build real-time portals, where tabs are delineated by key characteristics (e.g., site or micro-site). Therefore, the GUI 190 contemplates any suitable graphical user interface, such as a combination of a generic web browser, intelligent engine, and command line interface (CLI) that processes information in the platform and efficiently presents the results to the user visually.

As used in this disclosure, each client 175 is intended to encompass a personal computer, touch screen terminal, workstation, network computer, kiosk, wireless data port, smart phone, personal data assistant (PDA), one or more processors within these or other devices, or any other suitable processing device. For example, each client 175 may include a computer that includes an input device, such as a keypad, touch screen, mouse, or other device that can accept user information, and an output device that conveys information associated with the operation of one or more client applications 184, and/or the client 175 itself, including digital data, visual information, or the GUI 190. Both the input and output device may include fixed or removable storage media such as a magnetic storage media, CD-ROM, or other suitable media, to both receive input from and provide output to users of client 175 through the display, namely, the GUI 190. The client's processor 181, interface 178, and memory 187 may be similar to or different from those described in connection with the other components illustrated in FIG. 1, although alternative implementations of one or more of these components may be used, as well as implementations where additional components may also be included.

FIG. 1 depicts a server-client environment, but could also represent a cloud computing network. Various other implementations of the illustrated environment 100 can be provided to allow for increased flexibility in the underlying system, including multiple application systems 103 performing or executing one or more additional or alternative instances of the authentication module 130 for one or more different platforms, as well as multiple instances of the application 127 and its related functionality. In those instances, the different application systems 103 may communicate with each other via a cloud-based network or through the connections provided by network 148. Generally, the application system 103 may be communicably coupled with the network 148 that facilitates wireless or wireline communications between the components of the environment 100 (i.e., between the application system 103 and one or more clients 175), as well as with any other local or remote computer, such as additional clients, servers, or other devices communicably coupled to the network 148, including those not illustrated in FIG. 1. In the illustrated environment, the network 148 is depicted as a single network, but may be included in more than one network without departing from the scope of this disclosure, so long as at least a portion of the network 148 may facilitate communications between senders and recipients. In some instances, one or more of the components associated with the application system 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can include either a wireline or wireless link. Example wireless links may include 802.11/b/g/n, 802.20, WiMax®, and/or any other appropriate wireless link. In other words, the network 148 encompasses any internal or external network, networks, sub-network, or combination thereof operable to facilitate communications between various computing components inside and outside the illustrated environment 100. The network 148 may communicate with, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As used in this present disclosure, the term "computer" is intended to encompass any suitable processing device. For example, although FIG. 1 illustrates a single application system 103, environment 100 can be implemented using any number of servers, as well as computers other than servers, including a server pool. Indeed, the application system 103 may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated application system 103 may be adapted to execute any operating system, including Linux®, UNIX®, Windows®, Mac® OS, iOS, or any other suitable operating system.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding authentication module 130 and the application 127 stored on the associated application system 103. In some instances, a particular application system 103 may be associated with the execution of two or more applications 127 (and other related components), as well as one or more distributed applications executing across two or more servers executing the functionality associated with the application system 103.

Figure 2:
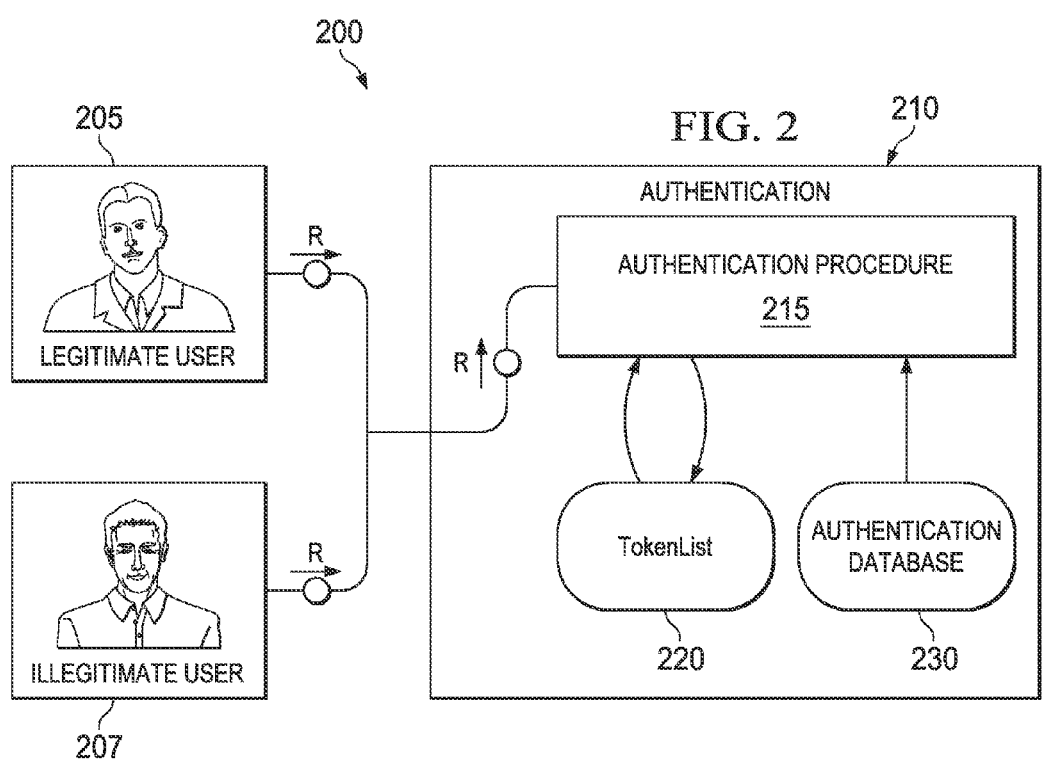
FIG. 2 illustrates an example environment of authenticating multiple end users.

FIG. 2 illustrates an example environment 200 of authenticating end users. The illustrated environment 200 includes a legitimate user 205, an illegitimate user 207, and an authentication module 210. The environment 200 may correspond to the illustrated environment 100 of FIG. 1, such as when multiple clients are present. The environment 200 focuses on the authentication processes occurring between the end users (both the legitimate user 205 and the illegitimate user 207) and the authentication module 210. The authentication module 210 can perform an authentication procedure 215 involving a list of valid tokens 220 and an authentication database 230. The list of valid tokens 220 may be similar to the list of valid tokens 139 and the authentication database 230 may be similar to the authentication database 135, in some instances. For example, the list of valid tokens 220 and the authentication database 230 may be stored in a physical memory used in an application system similar to the application system 103.

As illustrated in FIG. 2, the authentication procedure 215 can interact with the list of valid tokens 220 and receive verification information from the authentication database 230. For example, the legitimate user 205 and illegitimate user 207 can both attempt to be authenticated for a digital identity. The legitimate user 205 can provide valid authentication credentials verified using the authentication database 230. The illegitimate user 207 may use various methods attempting to guess a correct authentication credential. The authentication procedure 215 may receive an invalid credential from the illegitimate user 207 and assign a token tracked by the list of valid tokens 220. Multiple attempts of the illegitimate user 207 can allow the assigned or generated token to expose the illegitimate user 207 to various defensive security mechanisms in the authentication procedure 215. The legitimate user 205 can avoid the security mechanisms applied to the illegitimate user 207 by supplying a token included in the list of valid tokens 220 during lockout periods caused as a result of illegitimate users 207 providing invalid credentials. In some instances, the illegitimate user 207 may actually be a legitimate user who accidentally submitted or input incorrect credentials. An illegitimate user 207 may thus become a legitimate user 205 once valid credentials are input to and received by the authentication module 210.

Figure 3:
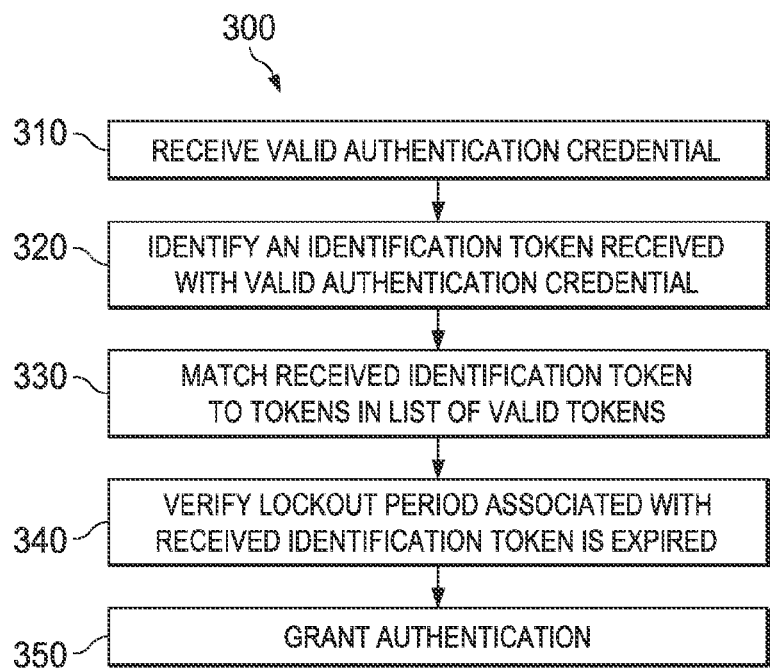
FIG. 3 illustrates an example method for interactively authenticating a legitimate end user.

FIG. 3 illustrates an example method 300 for interactively authenticating a legitimate end user while a lockout period is in effect for an associated digital identity. The example method 300 can be applied to the environment 100 illustrated in FIG. 1 when a legitimate user is attempting to login to or otherwise be authenticated by the client 175. The example method 300 can be applied for legitimate end users having valid authentication credentials. At 310, a valid authentication credential is received from an end user by a client at a computer system containing applications associated with a certain digital identity. For example, the end user can input authentication credentials, such as username and password combinations, visual cues, fingerprints, and other suitable credentials into or at the client (e.g., a remote computational device) for accessing an application or other program, module, or data in or associated with the computer system. The computer system can verify the validity of the received authentication credential by referring to an authentication database. At 320, an identification token may be identified with the valid authentication credential. The identification token may be assigned to the end user to associate with the authentication credential initially. In some implementations, the identification token may be generated for the end user after an error of authentication credentials has occurred and a lockout period is in effect. The identification token may be received from the client along with the authentication credentials. Authentication can be granted without an identification token if a general lockout period associated with the digital identities has expired.

At 330, the identified identification token can be matched with tokens in a list of valid tokens to determine whether the identification token is included in the list of valid tokens. The list of valid tokens can include tokens associated with authentication credentials that are not identified as invalid, for example, newly generated identification tokens, tokens associated with valid authentication credentials, and others. The illustrated method 300 assumes that the identified identification token is matched to a particular token in the list of valid tokens, such that method 300 continues to 340. At 340, the lockout period associated with the received identification token is verified to be expired. For example, if previous errors or attempts have initiated a lockout period associated with the received identification token, this lockout period has a higher security priority than valid credentials. The lockout period associated with the identified identification token is required to be expired before authentication can be granted. At 350, authentication is granted to the end user with valid authentication credentials and a valid identification token, even while a general lockout period is in effect for the associated digital identity.

In some implementations, the authentication can be granted directly to legitimate end users with valid credentials without a valid identification token when there is no lockout period in effect when the valid authentication credentials are received. Identification tokens are usually generated and assigned to credentials that include certain errors or error history (for example, mistyping a password and identified as invalid credential). The identification token can be used to identify digital identities having an erroneous authentication attempts since the most recent successful authentication attempt or creation of the digital identity. The identification token can effectively be used to identify illegitimate users and their malicious attempts to overcome the authentication process. This example is further discussed in FIG. 4.

Figure 4:
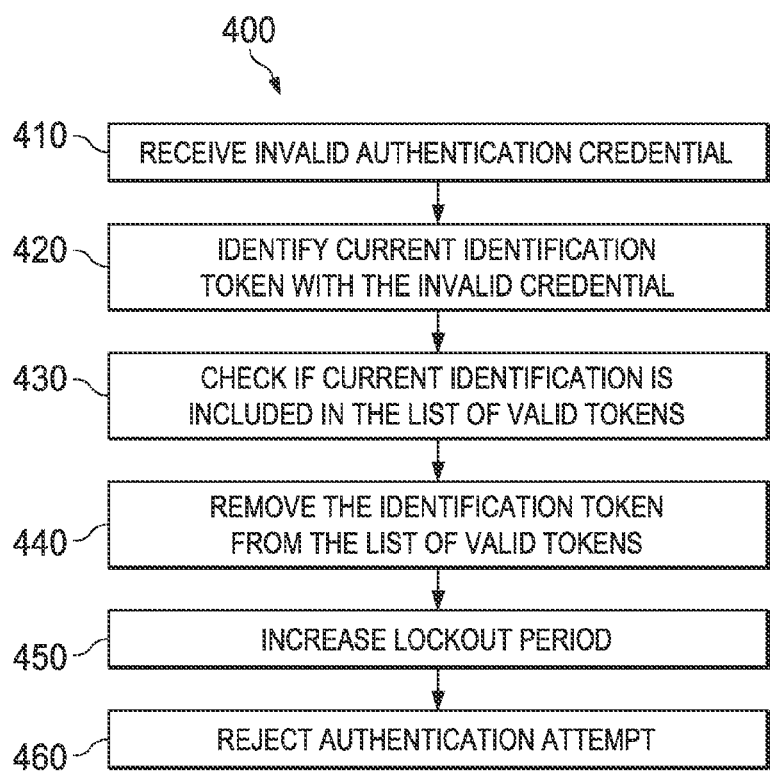
FIG. 4 illustrates an example method for interactively authenticating an illegitimate end user.

FIG. 4 illustrates an example method 400 for interactively authenticating an illegitimate end user. The example method 400 can be applied to the environment 100 illustrated in FIG. 1 when an illegitimate user is attempting to be authenticated by the client 175. The example method 400 can be applied for legitimate end users making a mistake in the authentication of credentials, or illegitimate end users having invalid authentication credentials. In some implementations, part or all of the method 400 can be used to identify and prevent illegitimate end users attempting to be authenticated by guessing or other methods to bypass the authentication, or to maliciously interrupt normal operation of legitimate end users by inducing defensive security mechanisms (e.g., blocking legitimate end users by inducing a lockout period). At 410, an invalid authentication credential is received. This may be caused by a mistake of credential input or data sampling from a legitimate user, or by an intended attempt at forging or identifying a valid authentication credential from an illegitimate user. In some implementations, the invalid authentication credential can be identified by an authentication verifier connected to an authentication database. For example, the credential verifier 132 of FIG. 1 can identify invalid authentication credentials using the authentication database 135.

At 420, a current identification token associated with the invalid credential is identified. The current identification token can be received along with the invalid credential, or can be generated and assigned to the invalid credential. For example, the invalid credential may be associated with an existing identification token that has been generated or assigned in previous authentication attempts; the existing identification token can be used as the current identification token. If there is no existing identification token, a new identification token can be generated and/or assigned to the invalid credential as the current identification token. At 430, the current identification token is checked for its inclusion in a list of valid tokens, such as the list of valid tokens 139 of FIG. 1. The list of valid tokens enables a valid credential to be recognized and be authenticated when lockout periods have expired. For invalid credentials, the list of valid tokens is modified: at 440, the identification token associated with the invalid credential is removed from the list of valid tokens. For example, the identification token will be recognized as not in the list of valid tokens in future authentication attempts, distinguishing the end user associated with the authentication credentials from legitimate end users who have tokens in the list of valid tokens.

At 450, a lockout period is triggered and/or the lockout period duration is increased. Other defensive mechanisms may be employed. For example, the lockout period may be set to infinite or indefinite, allowing only high profile administrators to intervene. During the lockout period, no authentication is generally allowed. In some instances, legitimate users with identification tokens found in the list of valid tokens may be authenticated, where the identification tokens were not issued during the current lockout period. At 460, the current authentication attempt is rejected and the end user is notified.

FIG. 5 illustrates an example overall flow chart 500 for interactive authentication. At 501, an end user attempts to be authenticated by a client device to an application system. The application system verifies the credentials of the end user at 505. If the end user provides valid authentication credentials, the application system checks whether an identification token is received with the authentication credential at 510. When an identification token is received, the flow continues at 522, where the identification token is assigned as the current identification token and is then examined for inclusion within a list of valid tokens at 524. If the current identification token exists in the list of valid tokens, the application system checks if a lockout period associated with the identification token in the list of valid tokens has expired at 526. If the lockout period has expired (or was not ever triggered), authentication is granted to the end user at 540; otherwise the authentication attempt is rejected at 550. In some implementations, valid authentication credentials can enable the computer system to reset or clear the list of valid tokens after successful authentication.

Returning to 524, if the received identification token is not included the list of valid tokens, the flow continues to 530 where a general lockout period associated with the digital identity being attempted for authentication is examined. If the general lockout period has expired, authentication is granted to the end user at 540; otherwise a new token (i.e., the current identification token) is added in the list of valid tokens 535 and the authentication attempt is rejected at 550. In a subsequent attempt, the new token will allow the end user to be authenticated, regardless of whether a new lockout period has been triggered, when the end user provides valid authentication credentials and the lockout period at the time is not the same lockout period as when the identification token was issued.

Returning to 510, if an identification token is not received with the valid credentials, the expiration of a general lockout period associated with the digital identify is checked at 530. If the lockout period has expired or is not currently triggered at 515, authentication is granted to the end user at 540 based on the valid authentication credentials; otherwise, a new identification token is generated at 517. The newly generated token is added to the list of valid tokens at 535 as an identification of the end user who has provided valid authentication credentials. However, the general lockout period associated with the digital identity is in effect (i.e., not expired) and authentication is rejected at 550. Again, in subsequent attempts, the new token will allow the end user to be authenticated, regardless of whether a new lockout period has been triggered, when the end user provides valid authentication credentials and the lockout period at the time of the attempt is not the same lockout period as when the identification token was issued.

Returning to 505, when the received authentication credential is determined to be invalid, the application system checks at 512 whether an identification token is supplied with the invalid authentication credential. If there is no supplied identification token, a new token is generated at 560 as the current identification token, and the flow continues to 570. If an identification token is supplied, however, the identification token is assigned to be the current identification token at 562. At 564, the current token is examined for inclusion in the list of valid tokens. If the current token is included in the list of valid tokens, the token is removed at 566 (i.e., the current token is no longer valid due to its association to invalid credentials). Once removed, the flow continues at 570. At 570, the application system checks for whether a general lockout period has expired. If the general lockout period has expired or is not in effect, the time duration of the lockout period is increased at 572, for example, in a linear or nonlinear manner; otherwise no action is required. At 550, the authentication attempt is rejected and the end user is notified.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for authenticating an end user, comprising:
   receiving a valid authentication credential associated with a digital identity, the valid authentication credential received from the end user at an input device in association with a login attempt;
   determining whether an identification token is received with the valid authentication credential;
   identifying the identification token as a token included in a list of valid tokens associated with the digital identity at an authentication system in response to the determination that the identification token is received with the valid authentication credential;
   determining, in response to the identification token being identified as included in the list of valid tokens, whether a lockout period associated with the identification token in the list of valid tokens has expired;
   authenticating the end user associated with the login attempt in response to the determination that the lockout period has expired;
   determining, in response to the determination that the identification token is not received, whether a lockout period associated with the digital identity has expired;
   generating, in response to the determination that the lockout period associated with the digital identity has not expired, a new identification token associated with the current lockout period;
   adding the new identification token in the list of valid tokens associated with the digital identity; and
   rejecting the authentication of the end user associated with the login attempt.

2. The computer-implemented method of claim 1, further comprising:
   determining, in response to the determination that the identification token is not received, that the lockout period associated with the digital identity has expired; and
   authenticating the end user associated with the login attempt in response to the determination that the lockout period associated with the digital identity which has expired.

3. The computer-implemented method of claim 1, further comprising:
   determining, in response to the determination that the identification token is not included in the list of valid tokens associated with the digital identity, whether the lockout period associated with the digital identity has expired; and
   authenticating the end user associated with the login attempt in response to the determination that the lockout period associated with the digital identity which has expired.

4. The computer-implemented method of claim 3, further comprising:
   adding the identification token to the list of valid tokens in response to the lockout period associated with the digital identity having not expired; and
   rejecting the end user associated with the login attempt.

5. The computer-implemented method of claim 1, further comprising rejecting the authentication of the end user associated with the login attempt in response to the determination that the lockout period associated with the identification token in the list of valid tokens which has not expired.

6. The computer-implemented method of claim 1, wherein authenticating the end user associated with the login attempt comprising granting the login attempt.

7. The computer-implemented method of claim 1, wherein the identification token is automatically provided by the input device at the login attempt.

8. The computer-implemented method of claim 1, wherein multiple digital identities are associated with the authentication system, and wherein each digital identity is associated with a corresponding list of valid tokens.

9. A system of one or more computers configured to perform operations for authenticating end users comprising:
   receiving a valid authentication credential associated with a digital identity, the valid authentication credential received from an end user at an input device in association with a login attempt;
   determining whether an identification token is received with the valid authentication credential;
   identifying the identification token as a token included in a list of valid tokens associated with the digital identity at an authentication system in response to the determination that the identification token is received;
   determining, in response to the identification token being identified as included in the list of valid tokens, whether a lockout period associated with the identification token in the list of valid tokens has expired;
   authenticating the end user associated with the login attempt in response to the determination that the lockout period has expired;
   determining, in response to the determination that the identification token is not received, whether a lockout period associated with the digital identity has expired;
   generating, in response to the determination that the lockout period associated with the digital identity has not expired, a new identification token associated with the current lockout period;
   adding the new identification token in the list of valid tokens associated with the digital identity; and
   rejecting the authentication of the end user associated with the login attempt.

10. The system of claim 9, further configured to perform operations comprising determining, in response to the determination that the identification token is not received, that the lockout period associated with the digital identity has expired; and authenticating the end user associated with the login attempt in response to the determination that the lockout period associated with the digital identity which has expired.

11. The system of claim 9, further configured to perform operations comprising:
   determining, in response to the determination that the identification token is not included in the list of valid tokens associated with the digital identity, whether the lockout period associated with the digital identity has expired; and
   authenticating the end user associated with the login attempt in response to the determination that the lockout period associated with the digital identity has expired.

12. The system of claim 11, further configured to perform operations comprising:
   adding the new identification token to the list of valid tokens in response to the lockout period associated with the digital identity having not expired; and
   rejecting the end user associated with the login attempt.

13. The system of claim 9, further configured to perform operations comprising:
   rejecting the authentication of the end user associated with the login attempt in response to the determination that the lockout period associated with the identification token in the list of valid tokens which has not expired.

14. A non-transitory computer-readable medium encoded with a computer program, the program comprising instructions that when executed by one or more computers cause the one or more computers to perform operations for authenticating an end user comprising:
   receiving a valid authentication credential associated with a digital identity, the valid authentication credential received from the end user at an input device in association with a login attempt;
   determining whether an identification token is received with the valid authentication credential;
   identifying the identification token as a token included in a list of valid tokens associated with the digital identity at an authentication system in response to the determination that the identification token is received;
   determining, in response to the identification token being identified as included in the list of valid tokens, whether a lockout period associated with the identification token in the list of valid tokens has expired;
   authenticating the end user associated with the login attempt in response to the determination that the lockout period has expired;
   determining, in response to the determination that the identification token is not received, whether a lockout period associated with the digital identity has expired;
   generating, in response to the determination that the lockout period associated with the digital identity has not expired, a new identification token associated with the current lockout period;
   adding the new identification token in the list of valid tokens associated with the digital identity; and
   rejecting the authentication of the end user associated with the login attempt.

* * * * *